United States Patent [19]
Candeletti

[11] Patent Number: 5,989,356
[45] Date of Patent: Nov. 23, 1999

[54] APPARATUS FOR REMOVING SNOW FROM MOTOR VEHICLE ROOFS

[76] Inventor: William Candeletti, 50 W. Oldis St., Rochelle Park, N.J. 07662

[21] Appl. No.: 09/021,048

[22] Filed: Feb. 9, 1998

[51] Int. Cl.⁶ .................................. B60S 3/04; B60S 3/06
[52] U.S. Cl. ................................ 134/6; 15/53.3; 15/97.3; 15/DIG. 2
[58] Field of Search ...................... 15/53.1, 53.2, 15/53.3, 97.3, DIG. 2; 134/6

[56] References Cited

U.S. PATENT DOCUMENTS

| | | |
|---|---|---|
| 2,579,866 | 12/1951 | Rosseau . |
| 2,627,080 | 2/1953 | Holmes . |
| 3,594,843 | 7/1971 | Sesia ......................................... 15/53.2 |
| 4,136,418 | 1/1979 | Griswold . |
| 4,263,729 | 4/1981 | Minnen . |
| 4,321,724 | 3/1982 | Samuels . |
| 4,470,167 | 9/1984 | Bivens . |
| 5,048,147 | 9/1991 | Belanger et al. . |
| 5,160,430 | 11/1992 | Gasser et al. . |
| 5,269,082 | 12/1993 | Sund et al. . |
| 5,570,524 | 11/1996 | Groat . |
| 5,613,260 | 3/1997 | Belanger et al. . |
| 5,732,723 | 3/1998 | Uesaka et al. ............................... 134/6 |
| 5,802,654 | 9/1998 | Yeaglin ................................. 15/DIG. 2 |

*Primary Examiner*—Terrence R. Till
*Attorney, Agent, or Firm*—Pennie & Edmonds LLP

[57] ABSTRACT

An apparatus for removing snow accumulation from motor vehicle roofs. The snow scraping apparatus has a scraping assembly adapted to remove snow from a motor vehicle roof and including a scraping member being horizontally oriented. The snow scraping apparatus also has a supporting assembly for holding the scraping assembly in an elevated position so that the motor vehicle can pass beneath the scraping member without interference. The scraping member is elevated from the ground by a height that is substantially the same as or slightly greater than that of the motor vehicle roof. As a result, the scraping member can remove snow accumulation from the motor vehicle roof as the motor vehicle passes beneath the scraping assembly. If desired, the scraping assembly can be a rotatable brushing member for removal of snow accumulation by tossing or throwing the snow away from the vehicle roof.

22 Claims, 7 Drawing Sheets

APPARATUS FOR REMOVING SNOW FROM MOTOR VEHICLE ROOFS

FIELD OF THE INVENTION

The present invention relates to an apparatus for removing snow and/or ice from predetermined motor vehicle surfaces. More particularly, the present invention relates to an apparatus that has an elevated scraping assembly for removing snow and/or ice from motor vehicle roofs.

BACKGROUND OF THE INVENTION

Figure 1:
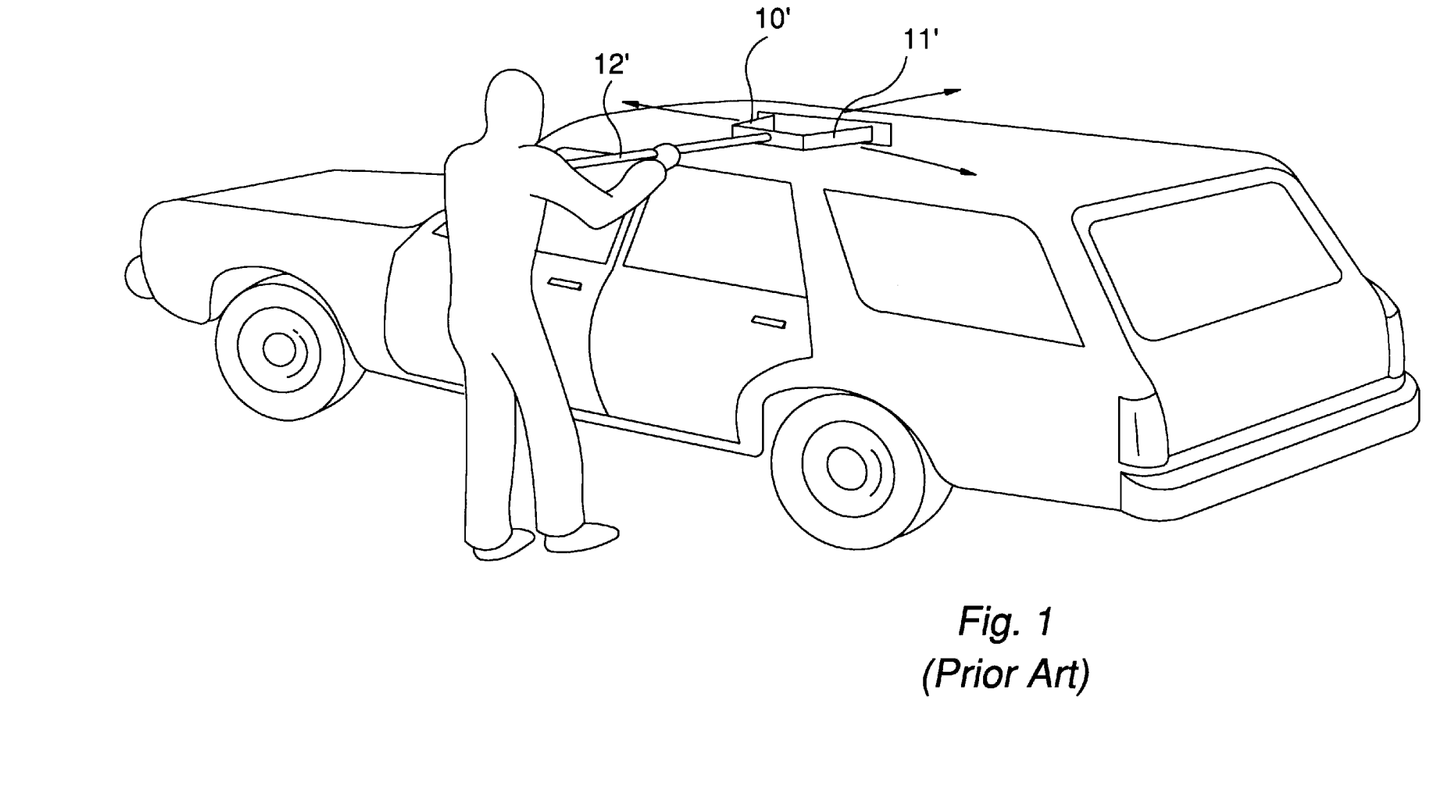
FIG. 1 shows the operation of a conventional snow removal device.

Various devices have been used to remove snow or ice deposits from motor vehicles. As depicted in FIG. 1, U.S. Pat. No. 4,321,724 issued to Samuels is directed to a snow removal device 10' that can facilitate the removal of snow accumulations from motor vehicle surfaces. More specifically, the device of Samuels has a sweeping head 11' which is secured to a handle 12'. The sweeping head 11' can thus be manipulated by a user to reciprocate along the handle axis or swing from side-to-side and thereby remove snow accumulation from a motor vehicle.

The designs of such conventional snow removal devices limit their use to motor vehicles that have a height within the user's reach. For over-sized motor vehicles such as heavy trucks, conventional snow removal devices are unable to access roof surfaces to remove snow therefrom.

It is often necessary to remove snow or ice accumulations from truck roofs since the heavy accumulations thereon can be hazardous to other motor vehicles or pedestrians. In certain states, such as New Jersey, motorists are now held liable if flying ice or snow from their vehicles causes death, injury or property damage.

Therefore, it is desirable to remove snow or ice deposits from motor vehicle roofs before the vehicle is put in use. The present invention provides a snow removal apparatus that can meet the above requirement.

SUMMARY OF THE INVENTION

The present invention relates to an apparatus for removing snow accumulation from a motor vehicle roof. The snow scraping apparatus comprises a scraping assembly which includes a scraping member adapted to remove snow accumulation from a motor vehicle roof. The scraping member is preferably made of a rigid material. The snow scraping apparatus further comprises a supporting assembly for adjustably positioning and holding the scraping assembly in an elevated position so that a motor vehicle can pass beneath without contacting the scraping member.

According to a preferred arrangement of the snow scraping apparatus of the present invention, the scraping member is positioned above the ground by a height H that is substantially the same as or slightly greater than that of the motor vehicle roof so that the motor vehicle can pass beneath the scraping assembly as the scraping member removes snow accumulation from the motor vehicle roof.

Preferably, the scraping assembly can be a carriage member mounted on the supporting assembly and can further include a blade member suspended from the carriage member. The carriage member is preferably made of a rigid material and the blade member is preferably made of a yielding material. The blade member extends below the scraping member to slidingly contact the motor vehicle roof as the motor vehicle passes thereunder.

In an alternative embodiment, the scraping assembly can comprise an auger unit and a blade member. The auger unit can be a rotatable brushing assembly positioned for contact with the vehicle roof. If desired, the brushing assembly can be used instead of the scraping member. If desired, the auger unit can be positioned above the scraping member. This unit includes an inlet portion defined by at least part of one of the scraping or blade members and an outlet portion for removal of snow from the motor vehicle roof. As the brushing member rotates, the snow is thrown from the outlet portion in a manner similar to that of a snow blower.

The snow scraping apparatus of the present invention can further comprise a height adjustment assembly for positioning the scraping assembly at a desired height on the supporting assembly. More specifically, the height adjustment assembly comprises at least one hydraulic controller and a hydraulic circuit. The hydraulic controller has a cylinder member mounted on one of the supporting assembly and the scraping assembly and a piston member mounted on the other. The hydraulic circuit acts to control the piston member to move in and out of the cylinder member to thus adjust the vertical position of the scraping assembly to accommodate various heights of motor vehicles.

The supporting assembly can comprise at least one upright frame member supporting the scraping assembly and having its lower end mounted on the ground. Thus, the carriage member of the scraping assembly can have at least one end movably mounted on the frame member by the height adjustment assembly.

In another alternative embodiment, the supporting assembly further comprises a beam member having at least one end supported on the frame member. The beam member is provided to movably support the scraping assembly through the height adjustment assembly. In this embodiment, the cylinder member of the hydraulic controller can be mounted on one of the beam member and the scraping assembly and the piston member mounted on the other. When the supporting assembly has a pair of upright frame members, they are spaced from each other and each supports an end of the beam member.

Additionally, the snow scraping apparatus of the present invention can further comprise a control circuit for simultaneously operating one or both height adjustment assemblies. The control circuit can be located at a lower end of the supporting assembly.

In a further embodiment of the present invention, the supporting assembly can comprise one upright frame member. More specifically, the upright frame member is in the form of a sleeve member having a hollow chamber therein for mounting the height adjustment assembly. In this embodiment, the scraping assembly can comprise a horizontal arm member having one end which is movably mounted on the frame member through the height adjustment assembly and the other end which is cantilevered and extends freely. The scraping assembly can also comprise an elongated carriage member mounted along the arm member and an elongated blade member suspended from the elongated carriage member.

Another embodiment of the invention relates to a method for removing snow accumulation from a motor vehicle roof by positioning a scraping assembly which includes a scraping member above the roof of the motor vehicle, and moving the motor vehicle beneath the scraping assembly so that the scraping member removes snow accumulation from the motor vehicle roof. The scraping member is positioned at a height that is greater than the height of the snow accumulation on the vehicle roof and is positioned slightly above, but not in contact with, the roof of the motor vehicle. As above, scraping assembly includes a carriage member and a blade member suspended from the carriage member, with the method further comprising the step of adjusting the position of the scraping assembly so that the blade member contacts the roof of the motor vehicle. Preferably, the scraping member is elongated and is positioned at an angle other than perpendicular to the forward direction of movement of the motor vehicle to assist in pushing snow accumulations from the motor vehicle roof as it passes beneath the scraping assembly. When the scraping assembly includes a rotatable brushing member, rotation of the brushing member as the vehicle moves beneath the scraping assembly assists in the removal of snow from the motor vehicle roof.

BRIEF DESCRIPTION OF THE DRAWINGS

These and other features, aspects, and advantages of the present invention will become much more apparent from the following description, appended claims, and accompanying drawings, in which:

FIG. 5b is an enlarged cross-sectional view taken along A—A in FIG. 5a;

FIG. 6a is a side view of the scraping apparatus as shown in FIG. 5a;

FIG. 6b is an enlarged cross-sectional view taken along B—B in FIG. 6a;

DETAILED DESCRIPTION OF THE PREFERRED EMBODIMENT

Various snow scraping apparatus embodying the principles of the present invention are illustrated in FIGS. 2–7. The scraping apparatus of the present invention is capable of removing snow or ice accumulation from various surfaces and particularly roofs of large-sized motor vehicles, such as heavy trucks and buses. In each embodiment, the same elements are designated with the same reference numerals and repetitive descriptions are omitted.

As depicted in FIGS. 2–7, the snow scraping apparatus of the present invention is generally designated by reference numeral 1. The snow scraping apparatus 1 is constituted mainly by a scraping assembly 10 and a supporting assembly 50 that holds the snow scraping assembly 10 in a desired position. The scraping assembly 10 has a scraping member 12 that is oriented horizontally or parallel to the motor vehicle surface from which snow accumulation is to be removed. The scraping member 12 can be elevated from the ground 3 by a height H that is substantially the same as or slightly greater than that of the motor vehicle roof so that the motor vehicle can pass beneath the scraping member 12 without interference. When the motor vehicle passes beneath the scraping assembly 10, the scraping member 12 removes snow or ice accumulation from the motor vehicle roof.

Figure 3:
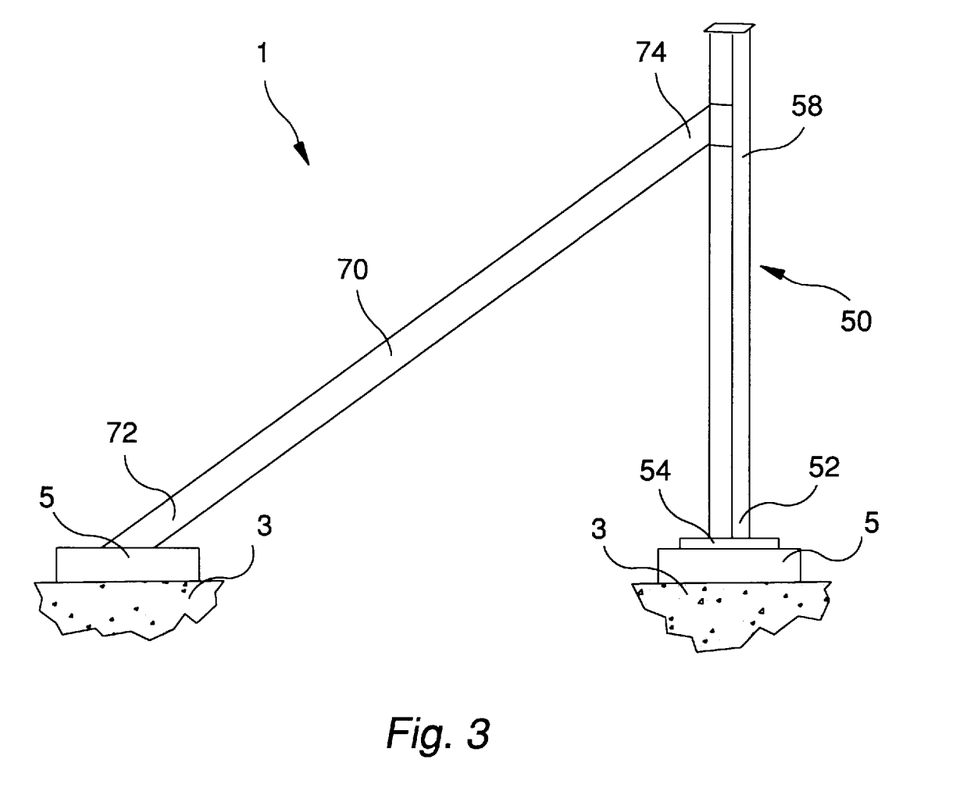
FIG. 3 is a side view of the scraping apparatus as shown in FIG. 2.

The scraping member 12 can have various shapes, such as straight (as shown in FIG. 3), curved and "V" shapes, in an elevated horizontal plane. Although a curved or "V" shaped scraping member 12 may have an advantageous scraping effect, a straight scraping member 12 is a simpler design. The scraping member 12 has a sufficient height h in the vertical direction so that the snow, after being scraped from the motor vehicle roof, cannot easily fall over the scraping member 12 and back onto the vehicle roof. The height h of the scraping member 10 can be determined in accordance with the snow accumulation and is preferably between 4 and 10 inches and more preferably between 6 and 8 inches.

In addition, the scraping assembly 10 can have various structures such as a unitary scraping member or the combination of a carriage member and a blade member as will be described hereinafter. In one embodiment, the scraping member 12 is an unitary member formed of a rigid material such as metal. According to a preferred embodiment, the scraping member 12 is an elongated steel beam or angle member. In an alternative embodiment, the scraping assembly 10 has a similar construction to that of a snow blower and comprises a housing member with inlet and outlet portions and an auger unit mounted in the housing member. The inlet portion of the housing member can be formed with at least part of the scraping member 12.

In the preferred embodiment where the scraping assembly 10 has an elongated shape, the scraping member 12 defines a length L that is preferably larger than the width of the motor vehicle. Thereby, when the motor vehicle passes beneath the scraping assembly 10, the scraping member 12 is in contact with the entire width of the motor vehicle roof. In another preferred embodiment where the elongated scraping assembly 10 is supported at only one end 14 and has the other end 14 cantilevered and extending freely, the length L can be less than the entire width of the motor vehicle roof, but should be at least half of the roof width.

Figure 2:
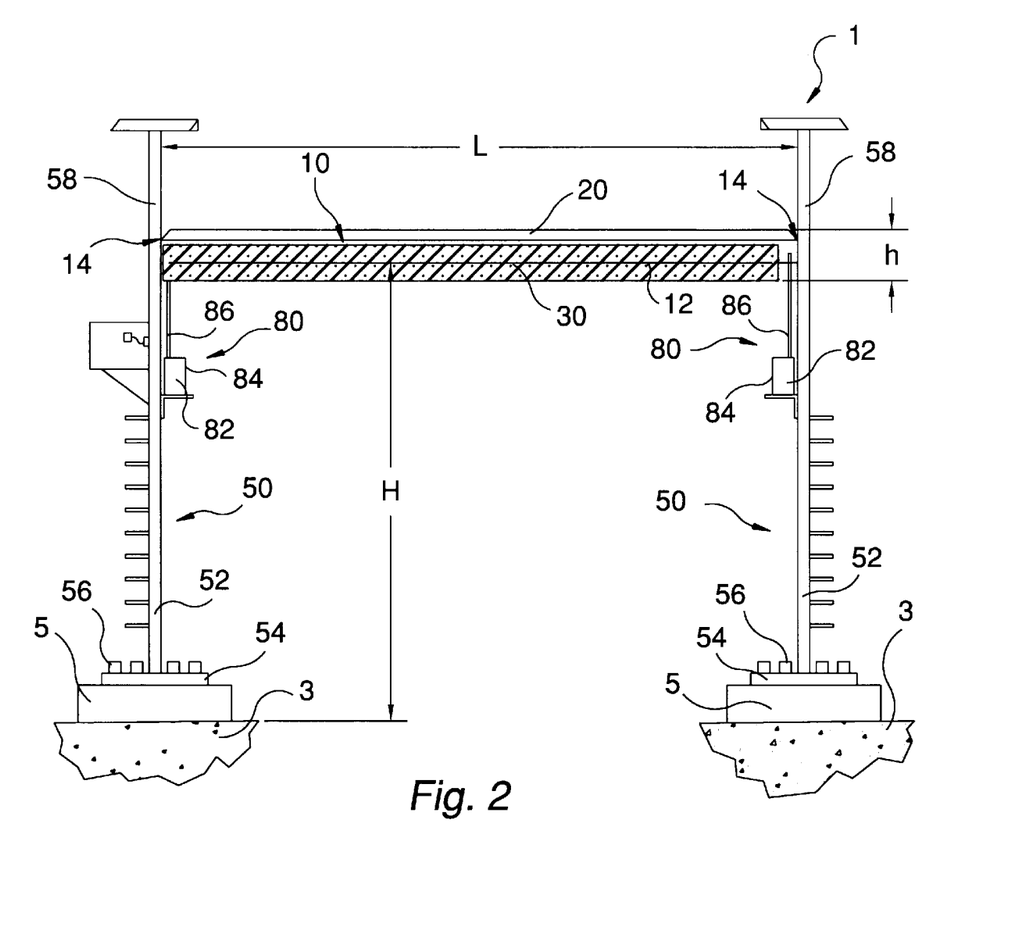
FIG. 2 is a front view of a snow scraping apparatus according to the first embodiment of the invention.
Figure 4:
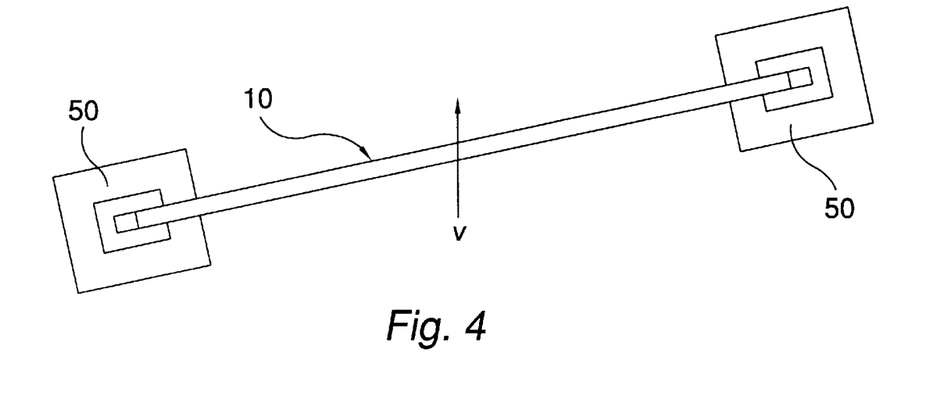
FIG. 4 is a top view of the scraping apparatus as shown in FIG. 2.

In a preferred embodiment as shown in FIGS. 2 to 4, the scraping assembly 10 is in the form of an elongated carriage member 20 having two ends 24 which are mounted on the supporting assembly 50. The bottom portion of the carriage member 20 forms the scraping member 12 as described hereinabove. The carriage member 20 is made of an unyielding or a rigid material, such as metal. The carriage member 20 provides support for mounting a blade member 30 as will be discussed hereinafter. In addition, the carriage member 20 provides sufficient rigidity to the entire scraping assembly 10 so that the scraping assembly 10 can remove a heavy accumulation of snow or ice from a motor vehicle roof.

The carriage member 20 is preferably elevated from the ground by a height h that is slightly greater than that of the motor vehicle. Thereby, the motor vehicle and particularly its roof portion can pass freely beneath the carriage member 20 without interference.

The scraping assembly 10 as shown in FIG. 2 also has an elongated blade member 30 suspended from the elongated carriage member 20. The blade member 30 is held on the carriage member 20 through any one of a variety of conventional attachment means such as adhesives, screws, bolts and clamps. The bottom portion of the blade member 30 extends below the scraping member 12. The blade member 30 is preferably made of a yielding material and thus is rigid enough to scrape the snow or ice accumulation from the motor vehicle roof but sufficiently pliable to avoid causing damage to the roof surface during the scraping operation. Thereby, the blade member provides additional scraping by slidingly contacting the motor vehicle roof to scrape the immediate deposit of snow therefrom. Materials suitable for the blade member 30 are plastic, rubber and other elastomeric materials.

The blade member 30 is elevated from the ground for a height so that the additional scraping portion 32 thereon can engage in a sliding contact with the motor vehicle roof as the motor vehicle passes thereunder during the scraping operation. Thereby, the blade member 30 is capable of scraping the immediate snow or ice deposits on the motor vehicle roof while the rest of the blade member 30 and the carriage member 20 act to push the snow accumulation away from the motor vehicle roof. In this manner, the scraping assembly 10 can completely remove the snow and/or ice accumulation from the motor vehicle roof without having the rigid carriage member 20 contact the vehicle roof and damage it.

The supporting assembly 50 shown in FIGS. 2–4 is preferably in the form of a pair of upright frame members 50. The frame members 50 are spaced from each other to allow the motor vehicle to pass therebetween. The frame members 50 can be of various conventional structures, such as steel "I" beams (see FIG. 5b) and the like. Each frame member 50 can have its lower end 52 mounted on the ground 3 by any conventional means. As shown in FIG. 2, each frame member 50 can include a mounting plate 54 at its lower end 52 to facilitate fixation to the ground. Such mounting plates 54 typically include holes thereon for use in connection with mounting bolts 56. In addition, various mounting aids such as cement footings 5 can be employed to assist in mounting the lower ends 52 of the frame members 50 on the ground 3.

It is also possible to use a single upright frame member and a cantilevered beam or carriage member the vertical position of which is adjustable. The cantilevered carriage member can include the blade member and additional scraping portion previously described.

To ensure the strength and stability of snow scraping apparatus 1 and particularly the frame member or members 50, an inclined frame member 70 can be provided. As shown FIG. 3, this member 70 further supports and strengthens the upright frame member 50. Each inclined frame member 70 has a lower end 72 mounted on the ground 3, similar to those of the upright frame members 52. The upper ends 74 of the inclined frame members 70 support the upright frame members 50 at their upper portion 58. The inclined frame members 70 can be in a similar form of the upright frame members 50, such as steel "I" beams (see FIG. 6b) and the like.

Each frame member 50 supports one end 14 of the scraping assembly 10 so as to hold the same in its elevated position. The scraping assembly 10 so held is generally directed transverse to the direction of movement of the motor vehicle below, as indicated by arrow v in FIG. 4. In particular, the scraping assembly 10 is preferably oriented at an angle to the direction of the movement as shown in FIG. 4 instead of perpendicular to the movement direction v. This design facilitates the removal of the snow accumulation by pushing it over the sides of the motor vehicle rather than the back.

A height adjustment assembly 80 can be further provided with the snow scraping apparatus 1 to thus movably support each end 14 of the scraping assembly 10 on the supporting assembly 50, and particularly on either the upright frame member 50 or the beam member 60. Thereby, the scraping assembly 10 can be raised or lowered or even inclined to a desired position to accommodate the height of any particular motor vehicle roof.

Various conventional mechanisms capable of performing height adjustment can be used as the height adjustment assembly 80. In the preferred embodiments shown herein, the height adjustment assembly 80 comprises at least one hydraulic controller 82 and a hydraulic circuit. The hydraulic controller 82 includes a cylinder member 84 mounted on one of the scraping assembly 10 and the supporting assembly 50 and a piston member 86 mounted on the other. If desired, however, either conventional pneumatic or electronic height adjusting devices can instead be used.

In the preferred embodiment shown in FIG. 2, a pair of hydraulic controllers 82 are provided to support the scraping assembly 10 at both ends 14. The cylinder members 84 thereof are mounted on the upper portions 58 of the upright frame members 50 through conventional means. The piston members 86 support the ends 24 on the carriage members 20 of the scraping assembly 10. The hydraulic circuit acts to control the piston members 86 to move in and out of the cylinder members 84 to thereby adjust the height of the scraping assembly 10. As a result, the scraping member 12 and blade member 30 on the scraping assembly 10 can be positioned at a desired height as described hereinabove.

The snow scraping apparatus 1 of the present invention can further have a control circuit for either simultaneously or separately operating the height adjustment assemblies 80. The control circuit can be enclosed in a control box 90 along with other control switches or handles for operating the snow scraping apparatus 1. The control box 90 can be located in a position, such as on one of the frame members 50, for an easy access by an operator. The control box 90 can move between an elevated position at the upper portion 58 of the frame member 50 (see FIG. 2) or a ground level position (see FIG. 5a) depending on the location of the operator.

Other control accessories including a perch member 92 and an escalating member 94 can be provided to assisting the operation of the snow scraping apparatus 1. The perch member 92 is preferably enclosed so as to shield the operator from any unfavorable environment conditions. The perch member 92 can be located at the ground level for the safety of the operator or elevated to a similar height of the scraping assembly 10 for the benefit of adjusting the height of the scraping assembly 10. In the latter case, the escalator member 94, such as a ladder mounted on one of the frame member 50, is a convenient means for assisting the operator to reach the elevated perch member 92.

Figure 5A:
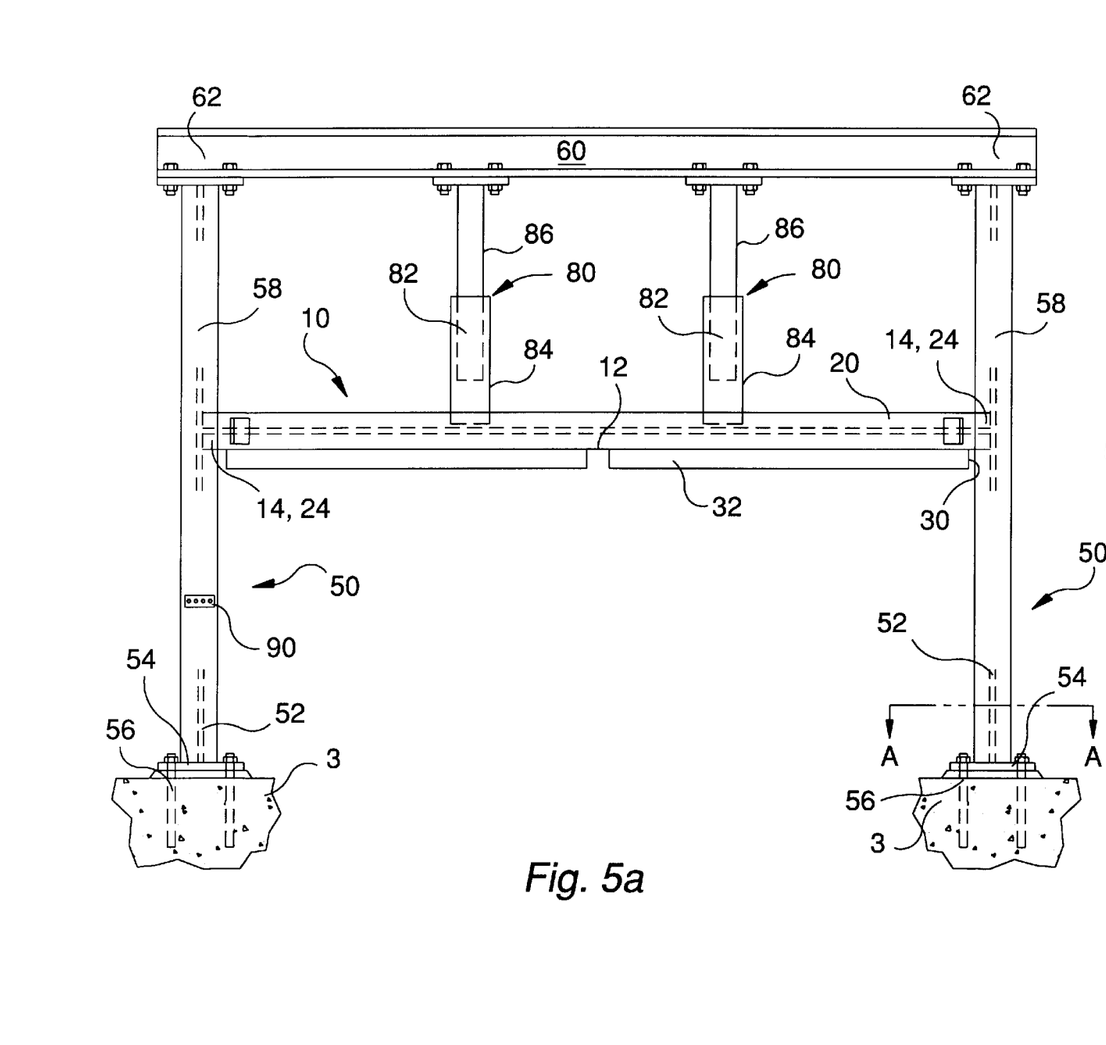
FIG. 5a is a front view of a snow scraping apparatus according to the second embodiment of the invention.
Figure 5B:
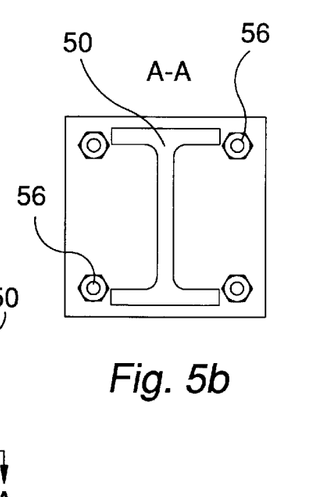
Figure 6A:
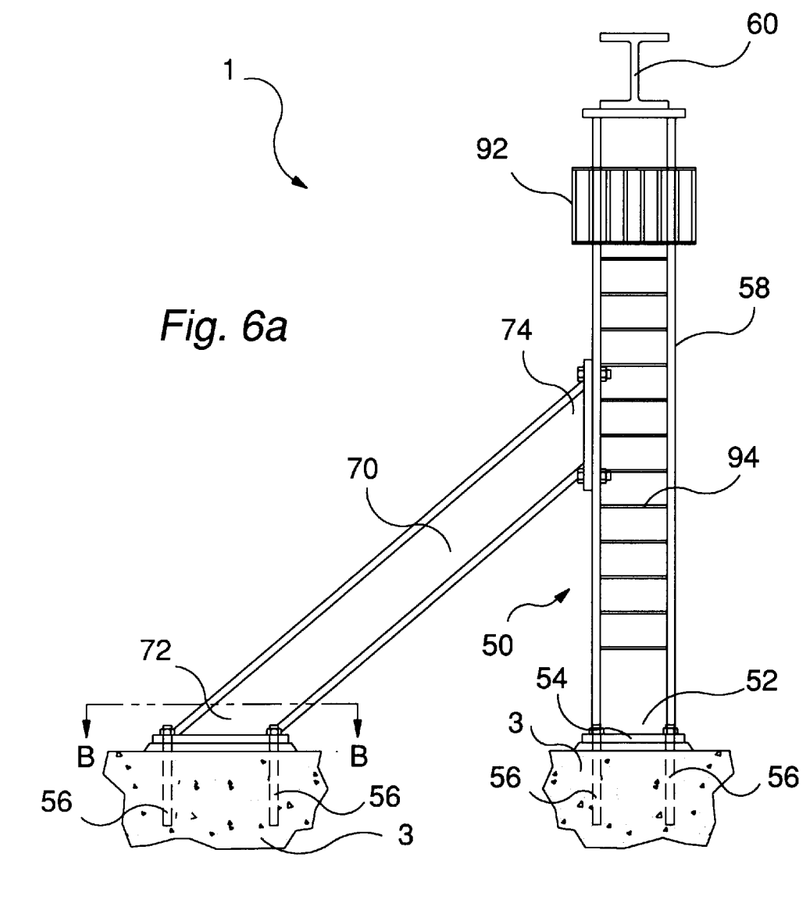
Figure 6B:
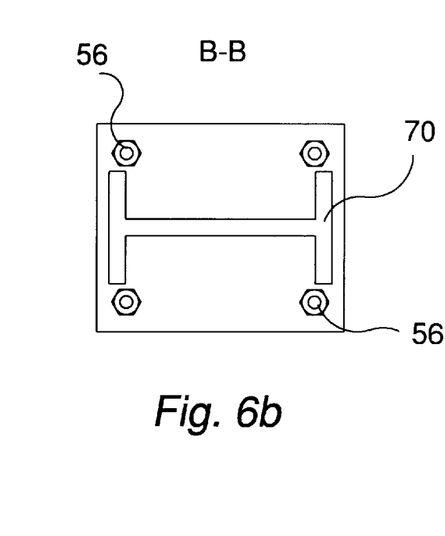

FIGS. 5 and 6 show another preferred embodiment of a snow scraping apparatus 1 of the present invention. In this preferred embodiment, the supporting assembly 50 further comprises a beam member 60 having its ends 62 fixedly mounted on the upright frame member 50. The beam member 60 can be in a similar form of the upright frame members 50, such as an steel "I" beams and the like. The beam member 60 is provided to movably support the scraping assembly 10 through the height adjustment assembly 80.

The height adjustment assembly 80 in this preferred embodiment includes a pair of hydraulic controllers 82 for movably mounting the scraping assembly 10 on the beam member 60. In contrast to the previously discussed embodiment, the piston members 86 of the hydraulic controllers 82 are suspended from the beam member 60 while the cylinder members 84 of the hydraulic controllers 82 are mounted to support the carriage member 20 of the scraping assembly 10. Under the control of a hydraulic circuit, the cylinder members 84 and the piston members can move relatively to each other and thus raise or lower the height of the scraping assembly 10 as desired.

As further illustrated in FIGS. 5a, 5b, 6a and 6b, the upright frame members 50, the inclined frame members 70, the beam member 60 and the carriage member 20 can all be formed by steel "I" beams. Such beams have an advantageous structure for providing convenient connections between the different frame, beam and carriage members 50, 70, 60 and 20 and therefore are preferred. It is also preferred that the carriage member 20 is made of a smaller sized steel beam so that its ends 24 can be accommodated in the vertical channels in the upright frame members 50.

Figure 7:
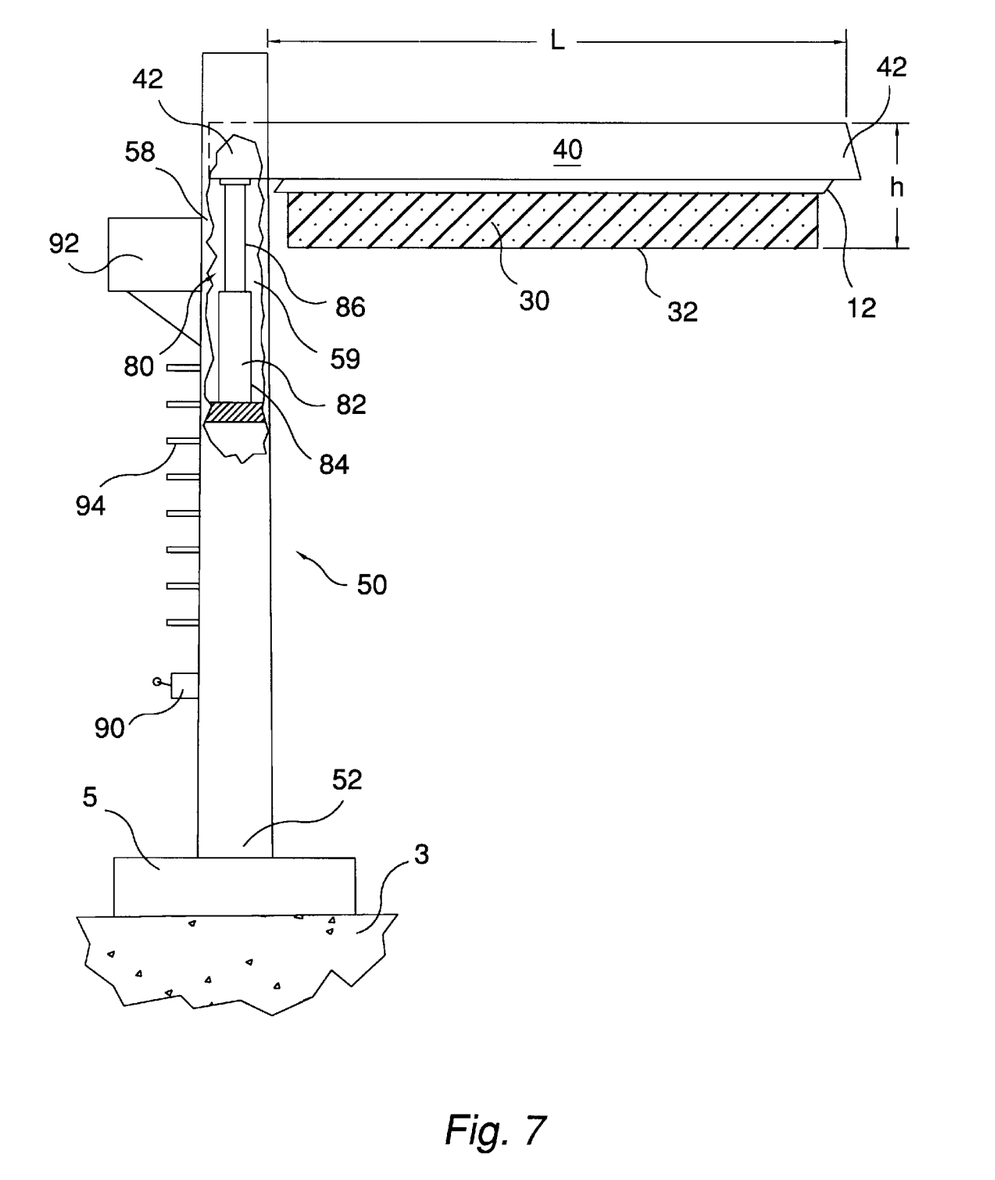
FIG. 7 is a front view of a snow scraping apparatus according to the third embodiment of the invention.

FIG. 7 shows a further preferred embodiment of the present invention, in which the supporting assembly 50 has only one upright frame member. The upright frame member 50 in this preferred embodiment is in the form of an elongated sleeve member having a hollow chamber 59. The hollow chamber 59 can be used to at least encase the height adjustment assembly 80 therein to therefore protect the same from adverse environmental conditions.

As illustrated in this preferred embodiment, the scraping assembly 10 further comprises a horizontal arm member 40. The arm member 40 has one of its ends 42 extending into the hollow chamber 59 and movably mounted on the sleeve member 50 through the height adjustment assembly 80. The other end 42 of the arm member 40 extends freely and away from the sleeve member 50, to thus forming a cantilever structure. Along the length of the arm member 40, there is mounted an elongated carriage member 20 which, in turn, carries an elongated blade member 30.

Similar to that in the first preferred embodiment, the cylinder member 84 of the hydraulic controller 82 is fixedly mounted on the frame member 50, which is the sleeve member. The piston member 86 fixedly supports the arm member 40 of the scraping assembly 10. Thereby, the arm member 40 can carry the carriage member 20 and the blade member 30 to move up or down until the scraping member 12 and blade member 30 arrive at their desired positions to accommodate a particular motor vehicle height.

The arm member 40 of the scraping assembly 10 is preferably oriented substantially perpendicular to the sleeve member 50. The arm member 40, together with the carriage member 20 and the blade member 30, has a length L that is at least half of the width of the motor vehicle roof and preferably is about the same as that of the motor vehicle roof. Thus, the scraping assembly 10 can scrape at least half of the snow accumulation on one side of the motor vehicle roof after the motor vehicle passes thereunder a first time. To remove the snow accumulation from the entire motor vehicle roof and particularly the other side of the roof, the motor vehicle passes beneath the scraping assembly 10 a second time. This design is advantageous when the motor vehicle to be operated has a particularly large width that would not fit between the two frame members 50 of the scraping apparatus 1 as described above.

Figure 8:
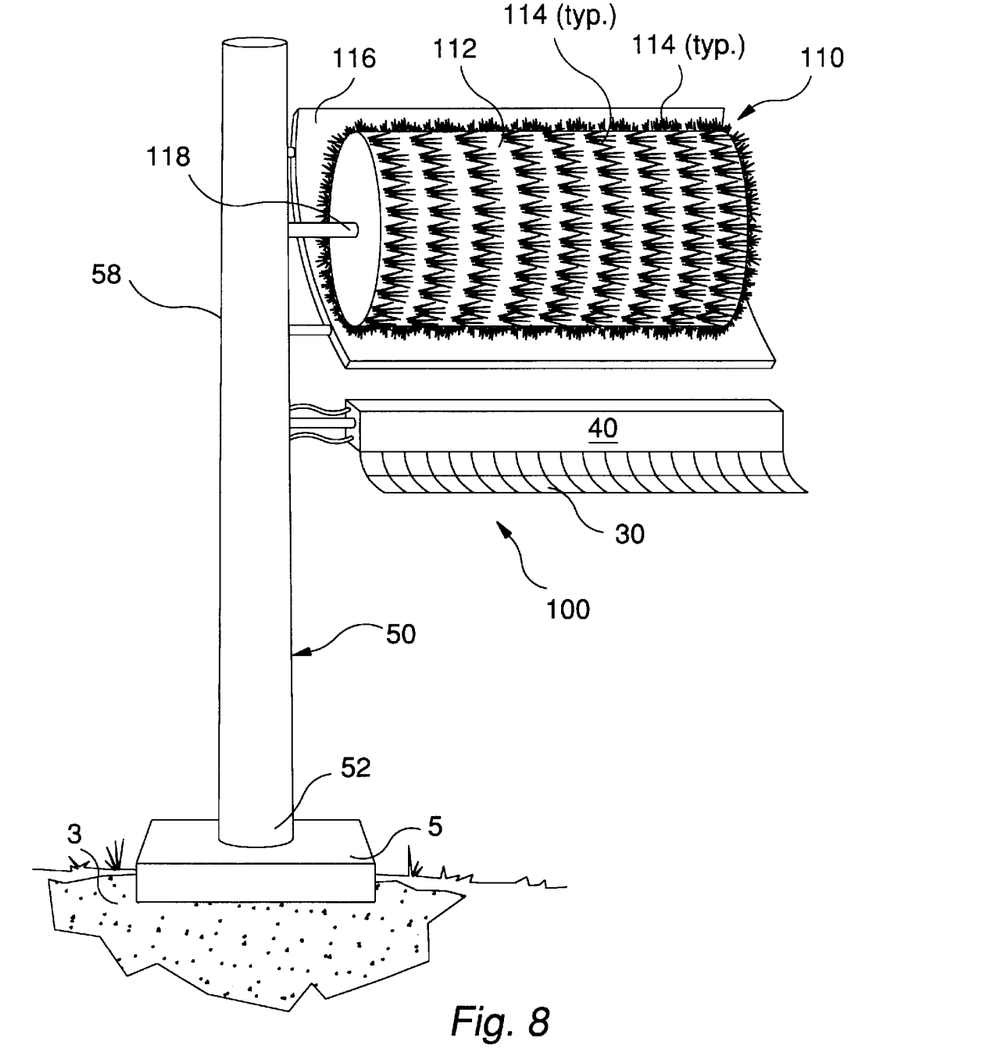
FIG. 8 is a front view of a snow scraping apparatus according to a fourth embodiment of the invention, where a rotatable brush member is used to assist in the removal of snow accumulation.

FIG. 8 illustrates a preferred scraping apparatus 100 that includes a supporting assembly which is similar to that of FIG. 7, and a similar horizontal arm member 40 and resilient blade member 30. FIG. 8 illustrates a rotatable brush member 110 which is mounted slightly above the arm 40 and blade 30 members.

The brushing apparatus 110 is in the form of an auger brush which includes a rotating drum 112 that has a plurality of bristles 114 securely mounted thereon in a desired pattern. In FIG. 8, groups of bristles are arranged in circumferential rows, although other patterns including spiral or staggered stripes, or a simple, random or patterned spacing of the groups of bristles 114 can be used. Preferably, the bristles are made of plastic or plastic coated metal similar to those used on street sweepers, so that they can dislodge and remove snow without damaging the vehicle roof.

A curved steel blade 116 is placed adjacent the rear of the drum and acts as a housing. This blade can extend from about 45° to 180° around the circumference of the drum. The curvature of the blade 116 is such that it creates a channelling effect in a manner similar to that of a conventional snow blower to throw snow off the vehicle when the brush member 100 is rotated.

The drum 112 is rotatably mounted on a shaft 118 which is driven by a motor (not shown). Rotation of shaft 118 by the motor rotates the drum 112 to enable the bristles 114 to contact and move snow against the blade 116 and then away from the vehicle roof. During operation, the assembly is positioned at an elevation slightly above the vehicle roof. The blade 30 initially contacts the roof to dislodge snow therefrom, while the bristles 114 of the rotating drum 112 lift and throw the snow against the blade 116 and off the vehicle roof. If desired, the drum 112 can be positioned so that the bristles 114 contact the roof of the vehicle to further remove snow therefrom, but it is entirely acceptable for the drum to be positioned above the arm member 40. Thus, in operation, the arm 40 and blade 30 members loosen and dislodge snow accumulation from the vehicle roof as the vehicle moves beneath them. The rotating drum 112 and bristles 114, in combination with the blade 116, then toss and throw the loosened snow away from the vehicle roof.

It is also possible to operate this system with only the rotating drum and without the arm 40 and blade 30 members. In this embodiment, the drum 112 and bristles 114 are positioned to just contact the roof of the vehicle so that rotation of the drum causes the snow accumulation to be removed from the vehicle as it passes thereunder. The bottom of the blade 116 can include a flexible or resilient member to minimize damage to the vehicle roof when contacted by the blade 116. As described above, suitable materials for this portion of the blade 116 include plastic, rubber and other elastomeric materials. These materials can be attached to the bottom of the blade by conventional means.

As described above, a ladder and operator perch can be provided, if desired, along with a perch or ground level mounted control box.

The foregoing description is only illustrative of the principle of the present invention. It is to be recognized and understood that the invention is not to be limited to the exact configuration as illustrated and described herein. As mentioned above, the preferred hydraulic design for adjusting the height of the carriage member can be substituted with pneumatic systems or even with electric or gas powered motor and chain arrangements to achieve the same results. It is also possible to design this system so that the scraping assembly moves along the roof of a stationary vehicle, but this adds unnecessary complication and expense. Instead, a stationary scraping assembly beneath which a vehicle can pass is a simpler, more efficient installation. Accordingly, all expedient modifications readily attainable by one versed in the art from the disclosure set forth herein that are within the scope and spirit of the present invention are to be included as further embodiments of the present invention.

What is claimed is:

1. An apparatus for removing snow accumulation from a motor vehicle roof comprising:
   a scraping assembly adapted to remove snow accumulation from a motor vehicle roof and including a scraping member; and
   a supporting assembly for adjustably positioning and holding the scraping assembly at a position such that the motor vehicle can pass beneath without contacting the scraping member;
   wherein the scraping assembly further comprises a rotatable brushing member for tossing of snow from the motor vehicle roof and is positioned above the ground by a height h that is substantially the same as or slightly greater than that of the motor vehicle roof so that the motor vehicle can pass beneath the scraping assembly as the scraping member removes snow accumulation from the motor vehicle roof.

2. apparatus An apparatus for removing snow accumulation from a motor vehicle roof comprising:
   a motor vehicle roof and including a scraping member; and
   a supporting assembly for adjustable positioning and holding the scraping assembly at a position such that the motor vehicle can pass beneath without contacting the scraping member;
   wherein the scraping member is positioned above the ground by a height h that is substantially the same as or slightly greater than that of the motor vehicle roof so that the motor vehicle can pass beneath the scraping assembly as the scraping member removes snow accumulation from the motor vehicle roof; and
   wherein the height adjustment assembly comprises at least one hydraulic controller and a hydraulic circuit, the hydraulic controller having a cylinder member mounted on one of the supporting assembly and the scraping assembly and a piston member mounted on the other, the hydraulic circuit controlling the piston member to move in and out of the cylinder member.

3. The apparatus of claim 2 wherein the supporting assembly comprises at least one upright frame member having its lower end mounted on the ground.

4. The apparatus of claim 3 wherein the scraping assembly comprises a carriage member and a blade member suspended from the carriage member, the carriage member having at least one end movably mounted on the frame member by the height adjustment assembly.

5. The apparatus of claim 3 wherein the supporting assembly further comprises a beam member having at least one end supported on the frame member, the beam member movably supporting the scraping assembly through the height adjustment assembly.

6. The apparatus of claim 5 wherein the supporting assembly comprises a pair of upright frame members, the frame members being spaced from each other and supporting both ends of the beam member.

7. The apparatus of claim 5 wherein the height adjustment assembly comprises at least one hydraulic controller and a hydraulic circuit, the hydraulic controller having a cylinder member mounted on one of the beam member and the scraping assembly and a piston member mounted on the other of the beam member and the scraping assembly.

8. The apparatus of claim 2 wherein the scraping assembly is a carriage member mounted on the supporting assembly and further comprises a blade member suspended from the carriage member, the blade member extending below the scraping member to slidingly contact the motor vehicle roof as the motor vehicle passes thereunder.

9. The apparatus of claim 8 wherein the carriage member is made of a rigid material and the blade member is made of a yielding material.

10. The apparatus of claim 2 wherein the scraping member of the scraping assembly is made of a rigid material.

11. The apparatus of claim 2 further comprising a height adjustment assembly for positioning the scraping assembly at the desired height on the supporting assembly.

12. An apparatus for removing snow accumulation from a motor vehicle roof comprising:
    a scraping assembly adapted to remove snow accumulation from a motor vehicle roof and including a scraping member; and
    a supporting assembly for adjustable positioning and holding the scraping assembly at a position such that the motor vehicle can pass beneath without contacting the scraping member;
    wherein the scraping member is positioned above the ground by a height h that is substantially the same as or slightly greater than that of the motor vehicle roof so that the motor vehicle can pass beneath the scraping assembly as the scraping member removes snow accumulation from the motor vehicle roof; and wherein the supporting assembly comprises one upright frame member, the scraping assembly further comprising a horizontal arm member having one end movably mounted on the frame member through the height adjustment assembly and the other of its ends extending freely.

13. The apparatus of claim 12 wherein the carriage member is elongated and is mounted along the arm member and the blade member is elongated and is suspended from the elongated carriage member.

14. The apparatus of claim 12 wherein the upright frame member is a sleeve member having a hollow chamber for mounting the height adjustment assembly therein, and further comprising a control circuit for operating the height adjustment assembly.

15. A method for removing snow accumulation from a motor vehicle roof which comprises positioning a scraping assembly which includes a scraping member above the roof of the motor vehicle, and moving the motor vehicle beneath the scraping assembly so that the scraping member removes snow accumulation from the motor vehicle roof, the scraping assembly further comprising a horizontal arm member having one end movably mounted on the frame member through the height adjustment assembly and the other of its ends extending freely.

16. The method of claim 15 wherein the scraping member is positioned at a height that is greater than the height of the snow accumulation on the vehicle roof and is positioned slightly above, but not in contact with, the roof of the motor vehicle.

17. The method of claim 15 wherein the scraping assembly includes a carriage member and a blade member suspended from the carriage member, with the method further comprising adjusting the position of the scraping assembly so that the blade member contacts the roof of the motor vehicle.

18. The method of claim 15 wherein the horizontal arm member and scraping member are elongated and positioned at an angle other than perpendicular to the forward direction of movement of the motor vehicle to assist in pushing slow accumulations from the motor vehicle roof.

19. A method for removing snow accumulation from a motor vehicle roof which comprises positioning a scraping assembly which includes a scraping member above the roof of the motor vehicle, and moving the motor vehicle beneath the scraping assembly so that the scraping member removes snow accumulation from the motor vehicle roof; wherein the scraping member is elongated and is positioned at an angle other than perpendicular to the forward direction of movement of the motor vehicle to assist in pushing snow accumulations from the motor vehicle roof.

20. The method of claim 19 wherein the scraping member is mounted for vertical movement on a horizontal arm member, that has first and second ends that are supported by upright frame members.

21. The method of claim 20 which further comprises providing a height adjustment assembly that includes at least one hydraulic controller and a hydraulic circuit for providing said vertical movement to the scraping member.

22. A method for removing snow accumulation from a motor vehicle roof which comprises positioning a scraping assembly which includes a scraping member above the roof of the motor vehicle, and moving the motor vehicle beneath the scraping assembly so that the scraping member removes snow accumulation from the motor vehicle roof; wherein the scraping assembly comprises a rotatable brushing member, and the method further comprises rotating the brushing member as the motor vehicle moves beneath the scraping assembly to toss snow from the motor vehicle roof.

* * * * *